United States Patent
Liang et al.

(10) Patent No.: US 12,275,656 B2
(45) Date of Patent: Apr. 15, 2025

(54) REGENERABLE NANOPARTICLE FOR REMOVING MANGANESE AND PREPARATORY AND USE METHODS

(71) Applicant: Jiangsu University of Technology, Changzhou (CN)

(72) Inventors: Guobin Liang, Changzhou (CN); Juan Wu, Changzhou (CN); Wei Lin, Changzhou (CN); Xiafei Yin, Changzhou (CN); Manying Zhang, Changzhou (CN); Quanfa Zhou, Changzhou (CN)

(73) Assignee: Jiangsu University of Technology, Changzhou (CN)

( * ) Notice: Subject to any disclaimer, the term of this patent is extended or adjusted under 35 U.S.C. 154(b) by 400 days.

(21) Appl. No.: 17/841,756

(22) Filed: Jun. 16, 2022

(65) Prior Publication Data

US 2022/0306492 A1     Sep. 29, 2022

(30) Foreign Application Priority Data

Aug. 30, 2021   (CN) .......................... 202111005486.4

(51) Int. Cl.
| | |
|---|---|
| *C02F 1/64* | (2023.01) |
| *C02F 1/28* | (2023.01) |
| *C02F 101/20* | (2006.01) |

(52) U.S. Cl.
CPC ................ *C02F 1/288* (2013.01); *C02F 1/64* (2013.01); *C02F 2101/206* (2013.01)

(58) Field of Classification Search
None
See application file for complete search history.

(56) References Cited

U.S. PATENT DOCUMENTS

2018/0133688 A1*  5/2018  Losic .................. B01J 20/3085

FOREIGN PATENT DOCUMENTS

CN           105597658 A         5/2016

OTHER PUBLICATIONS

Wing Sze Tung et al., New Approach Toward Nanosized Ferrous Ferric Oxide and Fe3O4-doped Titanium Dioxide Photocatalysts, ACS Applied Materials & Interfaces 2009 1 (11), 2453-2461 (Year: 2009).*

(Continued)

*Primary Examiner* — Chester T Barry
(74) *Attorney, Agent, or Firm* — IPRO, PLLC (57) ABSTRACT

The present disclosure discloses an efficient and regenerable nano manganese remover, and a method for preparing same and application thereof, belonging to the technical field of wastewater treatment and reuse. The manganese remover of the present disclosure includes $Fe_3O_4$, RGO, $SiO_2$ and EDTA. The $Fe_3O_4$ nanoparticles are supported on the surface of the RGO, the $SiO_2$ coats the $Fe_3O_4$, and the EDTA is grafted on the $SiO_2$. First, $Fe_3O_4$-RGO is prepared. Then, a TEOS-ethanol solution is dropwise added, and the resulting mixture is allowed to react to obtain $Fe_3O_4$@$SiO_2$-RGO composite particles. Finally, an EDTA-water solution is dropwise added to obtain the manganese remover. The manganese remover prepared in the present disclosure is magnetic, and the preparation process is simple and easy for industrial production. The nano manganese remover can quickly remove manganese in manganese-containing wastewater. A small amount of the manganese remover can achieve a large adsorption capacity. Further, the nano manganese remover can be separated from the manganese-containing wastewater quickly, thereby avoiding secondary pollution to the system.

8 Claims, 3 Drawing Sheets

(56) References Cited

OTHER PUBLICATIONS

Zhang, Chunxiao et al. "Preparation and adsorption property of Fe3O4@SiO2@EDTA magnetic composite microsphere" New Chemical Materials V 48 No. 9, Sep. 30, 2020.

* cited by examiner

REGENERABLE NANOPARTICLE FOR REMOVING MANGANESE AND PREPARATORY AND USE METHODS

TECHNICAL FIELD

The present disclosure relates to an efficient and regenerable nano manganese remover, and a preparation method and application thereof, belonging to the technical field of wastewater treatment and reuse.

BACKGROUND

In recent years, pollutions from manganese-containing wastewater, waste gas and solid waste discharged from manganese mines, metal smelters and other industries involving the use and processing of manganese cannot be ignored. Manganese in the air may enter water and soil, and accumulate in the soil. In particular, acidic soil is extremely sensitive to manganese in the air. Excess manganese in the soil will be absorbed by plants under the action of microorganisms, bioaccumulate through the food chain, and eventually enter the human body to damage the brain and respiratory system and cause various diseases, causing harm to the human body. Therefore, it is of great significance to remove manganese in manganese-containing wastewater, waste gas and solid waste, especially in manganese-containing wastewater. In the commercial manganese removers on the market, the main component for removing manganese is manganese sand which is based on its actions of contact oxidation and adsorption. However, filtration with manganese sand has certain requirements for the oxygen content of wastewater, which limits its usage in specific processes to some extent. Also, it requires a high dose of manganese sand, so it is complicated to collect and transform the material obtained after manganese removal, which may cause secondary pollution to the water. In addition, a large floor area is required for the treatment, which makes the cost higher.

Manganese exists in wastewater mainly in the forms of $Mn^{2+}$ and $MnO_4^-$. $Mn^{2+}$ mainly exists in the wastewater discharged from iron and steel enterprises and the wastewater from manganese mines. Because potassium permanganate is often used in the treatment of industrial wastewater, domestic sewage and micro-polluted water, $MnO_4^-$ mainly exists in the wastewater obtained after these treatments, as well as in textile wastewater and printing and dyeing wastewater. In the prior art, the manganese removers are mainly aimed at divalent manganese ($Mn^{2+}$). The manganese in the form of permanganate is treated mainly through the reaction between the permanganate with strong oxidizing property and the other pollutants with reducing property contained in the wastewater. The prior art can remove some but not all $MnO_4^-$.

SUMMARY

Technical Problem

The manganese removers in the prior art are mainly aimed at $Mn^{2+}$-containing wastewater. However, for the $MnO_4^-$-containing wastewater, the prior art can remove some but not all the permanganate ions.

Technical Solutions

In order to solve the above technical problem, the present disclosure provides an efficient and regenerable nano manganese remover, and a preparation method and application thereof. The nano manganese remover of the present disclosure can quickly remove $MnO_4^-$ in manganese-containing wastewater. A small amount of the manganese remover can achieve a large adsorption capacity. Further, the nano manganese remover can be separated from the manganese-containing wastewater quickly, thereby avoiding secondary pollution to the system. In addition, the nano manganese remover of the present disclosure is regenerable and recyclable.

The present disclosure is realized by the following technical solutions:

The present disclosure provides an efficient and regenerable nano manganese remover. The nano manganese remover includes ferrous ferric oxide ($Fe_3O_4$) nanoparticles, reduced graphene oxide (RGO), silicon dioxide ($SiO_2$) and ethylenediaminetetraacetic acid disodium salt (EDTA). The $Fe_3O_4$ nanoparticles are supported on the surface of the RGO, the $SiO_2$ coats the $Fe_3O_4$, and the EDTA is grafted on the $SiO_2$.

Further, mass percentages of the $Fe_3O_4$ nanoparticles, the RGO, the $SiO_2$ and the EDTA are respectively 5.3-16.3%, 0.37-5.7%, 7.4-76% and 17.5-86.9%.

The present disclosure further provides a preparation method of the efficient and regenerable nano manganese remover. The method includes the following steps:

(1) preparing $Fe_3O_4$-RGO;

(2) dispersing the $Fe_3O_4$-RGO prepared in step (1) in an ethanol-water solution, dropwise adding ammonia water to adjust pH to 8-13, carrying out ultrasonic dispersion for a period of time, transferring the mixture into a reactor, and dropwise adding a TEOS-ethanol solution under stirring; after the completion of the dropwise addition, continuing the reaction for a period of time; after the completion of the reaction, collecting the product with a magnet, washing the product with water, and drying the product to obtain $Fe_3O_4@SiO_2$-RGO composite particles; and (3) dispersing the $Fe_3O_4@SiO_2$-RGO composite particles obtained in step (2) in water, transferring the mixture into a reactor, and dropwise adding an EDTA-water solution at a certain temperature under stirring to obtain the final product magnetic nano manganese remover $Fe_3O_4@SiO_2@EDTA$-RGO.

Further, the $Fe_3O_4$-RGO in step (1) is prepared by a one-step solvothermal method, including: dispersing $FeCl_3 \cdot 6H_2O$, RGO and NaAC in a mixture of ethylene glycol and diethylene glycol, carrying out reaction at a certain temperature for a period of time, cooling the reaction mixture, collecting the prepared $Fe_3O_4$-RGO with a magnet, and washing and drying the $Fe_3O_4$-RGO.

Further, a mass ratio of the RGO to the $FeCl_3 \cdot 6H_2O$ to the NaAc is (0.02-0.1):1:(12-22); a volume ratio of the ethylene glycol to the diethylene glycol is 1:(0.5-2); and the certain temperature is 180-220° C., and the period of time is 6-18 h.

Further, in step (2), a volume ratio of ethanol to water in the ethanol-water solution is 1:(1-8), and the water is preferably ultrapure water.

Further, in step (2), a concentration of the ammonia water is 10-28 wt %.

Further, in step (2), a volume fraction of TEOS in the TEOS-ethanol solution is 1.5-5%, and the period of time of the reaction is 8-12 h.

Further, in step (3), the temperature is 50-80° C., a concentration of the EDTA-water solution is 0.050-0.175 mol/L, and the reaction is carried out for 0.5-4 h.

The present disclosure further provides a method for removing permanganate ions in manganese-containing wastewater. The method removes the permanganate ions by using the efficient and regenerable nano manganese remover described above or the efficient and regenerable nano manganese remover prepared by the method described above.

Further, the manganese-containing wastewater includes industrial wastewater such as electronic waste treatment wastewater, textile wastewater, printing and dyeing wastewater, metallurgical manganese-containing wastewater after treatment with potassium permanganate, and incineration fly ash leachate, especially wastewater containing permanganate ions.

Further, a small amount of the magnetic nano manganese remover used can achieve a higher removal rate of manganese. The magnetic nano manganese remover of the present disclosure can remove manganese quickly within a short time. Meanwhile, the nano manganese remover can be separated from the wastewater system quickly after being used for manganese removal, thereby avoiding secondary pollution to the system.

Further, the process of adsorbing permanganate ions includes: adding the magnetic nano manganese remover to the manganese-containing wastewater, shaking the mixture, and after the reaction is completed, carrying out solid-liquid separation using an external magnetic field, thereby completing the manganese removal.

Further, the nano manganese remover is used in an amount of 0.01-100 mg/mL; and an initial concentration of permanganate in the manganese-containing wastewater is 0.1-2 mg/L.

The present disclosure further provides a manganese removal reagent containing the efficient and regenerable nano manganese remover described above or the efficient and regenerable nano manganese remover prepared by the method described above.

The present disclosure further provides application of the efficient and regenerable nano manganese remover described above or the efficient and regenerable nano manganese remover prepared by the method described above in the field of wastewater treatment.

The present disclosure has the following beneficial effects:

(1) In the present disclosure, the oxidative groups remaining on the RGO provide a site for the immobilization of the magnetic nano material $Fe_3O_4$. The use of the sheet-like RGO not only increases the surface area of the material, but also enhances the dispersibility of the composite material in water. The $Fe_3O_4$ nanoparticles can endow the nano manganese remover with magnetic responsiveness, so that the synthesized magnetic nano manganese remover can be effectively separated from the manganese-containing system under the action of the external magnetic field, thereby avoiding secondary pollution to the system.

(2) The $SiO_2$ in the magnetic nano manganese remover can modify the $Fe_3O_4$-RGO. On the one hand, this modification can endow the magnetic nano manganese remover with good dispersibility, adsorption capacity and oxidation resistance. On the other hand, the surface of the $SiO_2$ is rich in silanol groups, so a large amount of EDTA can be grafted thereon, thereby increasing the removal rate of manganese.

(3) The efficient and regenerable manganese remover ($Fe_3O_4$@$SiO_2$@EDTA-RGO) of the present disclosure has the advantages of low preparation cost and wide raw material sources, and is convenient for industrial production. Besides, the efficient and regenerable manganese remover has excellent recyclability and manganese removal effect, and has great application potential in the field of manganese-containing wastewater treatment. Moreover, the manganese removal process has no requirement for oxygen content, and a small amount of manganese remover added can realize efficient manganese removal.

(4) The efficient regenerable manganese remover of the present disclosure can be reused many times, which is economical and environmentally friendly.

BRIEF DESCRIPTION OF FIGURES

In order to more clearly illustrate the technical solutions of the examples of the present disclosure, the accompanying drawings used in the description of the examples will be briefly described below. It is apparent that the accompanying drawings in the following description are only some examples of the present disclosure. Those skilled in the art can obtain other accompanying drawings according to these drawings without any creative work.

DETAILED DESCRIPTION

The technical solutions in the examples of the present disclosure will be clearly and completely described below with reference to the accompanying drawings in the examples of the present disclosure. It is apparent that the described examples are only a part of the examples, rather than all of the examples of the present disclosure. The following description of at least one exemplary example is merely illustrative in nature and is in no way intended to limit the present disclosure and its application or uses. All other examples obtained by those skilled in the art based on the examples in the present disclosure without creative work are within the protection scope of the present disclosure.

Example 1: Preparation of Efficient and Renewable Nano Manganese Remover 37.5 mL of ethylene glycol and 37.5 mL of diethylene glycol were added to a 100 mL beaker. Under the action of ultrasonic stirring, 10 mg of RGO, 0.21 g of $FeCl_3 \cdot 6H_2O$ and 3.75 g of NaAc were added to form a homogeneous solution, and the homogeneous solution was transferred into a high pressure reactor to react at 200° C. for 8 h. After the reaction mixture was cooled to room temperature, the $Fe_3O_4$-RGO nanoparticles were collected, washed, dried and then ultrasonically dispersed in a mixture of 80 mL of ultrapure water and 20 mL of anhydrous ethanol. 25 wt % ammonia water was added to adjust the pH to 8, and the solution was transferred into a three-necked flask and stirred. 20 mL of TEOS-ethanol solution (1.5%, v/v) was dropwise added, and the mixture was stirred at room temperature for 12 h. After the completion of the reaction, magnetic separation was carried out, and the $Fe_3O_4$@$SiO_2$-RGO composite particles were collected, washed and dried. Then, the composite particles were added to 20 mL of ultrapure water and ultrasonically dispersed. The resulting mixture was transferred to a three-necked flask. 12 mL of a 0.125 mol/L EDTA solution was dropwise added, and the system was allowed to react at 80° C. for 2 h. Magnetic separation was carried out. The obtained composite particles were washed and dried to obtain the $Fe_3O_4$@$SiO_2$@EDTA-RGO magnetic nano manganese remover.

Example 2: Preparation of Efficient and Renewable Nano Manganese Remover 37.5 mL of ethylene glycol and 37.5 mL of diethylene glycol were added to a 100 mL beaker. Under the action of ultrasonic stirring, 5 mg of RGO, 0.21 g of $FeCl_3.6H_2O$ and 3.75 g of NaAc were added to form a homogeneous solution, and the homogeneous solution was transferred into a high pressure reactor to react at 200° C. for 8 h. After the reaction mixture was cooled to room temperature, the $Fe_3O_4$-RGO nanoparticles were collected, washed, dried and then ultrasonically dispersed in a mixture of 50 mL of ultrapure water and 50 mL of anhydrous ethanol. 28 wt % ammonia water was added to adjust the pH to 9, and the solution was transferred into a three-necked flask and stirred. 20 mL of TEOS-ethanol solution (5%, v/v) was dropwise added, and the mixture was stirred at room temperature for 12 h. After the completion of the reaction, magnetic separation was carried out, and the $Fe_3O_4$@$SiO_2$-RGO composite particles were collected, washed and dried. Then, the composite particles were added to 20 mL of ultrapure water and ultrasonically dispersed. The resulting mixture was transferred to a three-necked flask. 12 mL of a 0.175 mol/L EDTA solution was dropwise added, and the system was allowed to react at 50° C. for 2 h. Magnetic separation was carried out. The obtained composite particles were washed and dried to obtain the $Fe_3O_4$@$SiO_2$@EDTA-RGO magnetic nano manganese remover.

Example 3: Preparation of Efficient and Renewable Nano Manganese Remover 37.5 mL of ethylene glycol and 37.5 mL of diethylene glycol were added to a 100 mL beaker. Under the action of ultrasonic stirring, 10 mg of RGO, 0.21 g of $FeCl_3.6H_2O$ and 3.75 g of NaAc were added to form a homogeneous solution, and the homogeneous solution was transferred into a high pressure reactor to react at 180° C. for 10 h. After the reaction mixture was cooled to room temperature, the $Fe_3O_4$-RGO nanoparticles were collected, washed, dried and then ultrasonically dispersed in a mixture of 60 mL of ultrapure water and 40 mL of anhydrous ethanol. 25 wt % ammonia water was added to adjust the pH to 13, and the solution was transferred into a three-necked flask and stirred. 20 mL of TEOS-ethanol solution (5%, v/v) was dropwise added, and the mixture was stirred at room temperature for 8 h. After the completion of the reaction, magnetic separation was carried out, and the $Fe_3O_4$@$SiO_2$-RGO composite particles were collected, washed and dried. Then, the composite particles were added to 20 mL of ultrapure water and ultrasonically dispersed. The resulting mixture was transferred to a three-necked flask. 12 mL of a 0.050 mol/L EDTA solution was dropwise added, and the system was allowed to react at 60° C. for 1 h. Magnetic separation was carried out. The obtained composite particles were washed and dried to obtain the $Fe_3O_4$@$SiO_2$@EDTA-RGO magnetic nano manganese remover.

Example 4: Preparation of Efficient and Renewable Nano Manganese Remover 37.5 mL of ethylene glycol and 37.5 mL of diethylene glycol were added to a 100 mL beaker. Under the action of ultrasonic stirring, 10 mg of RGO, 0.21 g of $FeCl_3.6H_2O$ and 3.75 g of NaAc were added to form a homogeneous solution, and the homogeneous solution was transferred into a high pressure reactor to react at 200° C. for 8 h. After the reaction mixture was cooled to room temperature, the $Fe_3O_4$-RGO nanoparticles were collected, washed, dried and then ultrasonically dispersed in a mixture of 80 mL of ultrapure water and 20 mL of anhydrous ethanol. 28 wt % ammonia water was added to adjust the pH to 13, and the solution was transferred into a three-necked flask and stirred. 20 mL of TEOS-ethanol solution (1.5%, v/v) was dropwise added, and the mixture was stirred at room temperature for 12 h. After the completion of the reaction, magnetic separation was carried out, and the $Fe_3O_4$@$SiO_2$-RGO composite particles were collected, washed and dried. Then, the composite particles were added to 20 mL of ultrapure water and ultrasonically dispersed. The resulting mixture was transferred to a three-necked flask. 12 mL of a 0.125 mol/L EDTA solution was dropwise added, and the system was allowed to react at 70° C. for 2 h. Magnetic separation was carried out. The obtained composite particles were washed and dried to obtain the $Fe_3O_4$@$SiO_2$@EDTA-RGO magnetic nano manganese remover.

Example 5: Preparation of Efficient and Renewable Nano Manganese Remover 37.5 mL of ethylene glycol and 18.5 mL of diethylene glycol were added to a 100 mL beaker. Under the action of ultrasonic stirring, 6 mg of RGO, 0.15 g of $FeCl_3.6H_2O$ and 2.55 g of NaAc were added to form a homogeneous solution, and the homogeneous solution was transferred into a high pressure reactor to react at 200° C. for 8 h. After the reaction mixture was cooled to room temperature, the $Fe_3O_4$-RGO nanoparticles were collected, washed, dried and then ultrasonically dispersed in a mixture of 80 mL of ultrapure water and 20 mL of anhydrous ethanol. 10 wt % ammonia water was added to adjust the pH to 8, and the solution was transferred into a three-necked flask and stirred. 20 mL of TEOS-ethanol solution (2%, v/v) was dropwise added, and the mixture was stirred at room temperature for 12 h. After the completion of the reaction, magnetic separation was carried out, and the $Fe_3O_4$@$SiO_2$-RGO composite particles were collected, washed and dried. Then, the composite particles were added to 20 mL of ultrapure water and ultrasonically dispersed. The resulting mixture was transferred to a three-necked flask. 12 mL of a 0.050 mol/L EDTA solution was dropwise added, and the system was allowed to react at 80° C. for 1 h. Magnetic separation was carried out. The obtained composite particles were washed and dried to obtain the $Fe_3O_4$@$SiO_2$@EDTA-RGO magnetic nano manganese remover.

Example 6: Preparation of Efficient and Renewable Nano Manganese Remover 25 mL of ethylene glycol and 37.5 mL of diethylene glycol were added to a 100 mL beaker. Under the action of ultrasonic stirring, 6 mg of RGO, 0.15 g of $FeCl_3.6H_2O$ and 2.55 g of NaAc were added to form a homogeneous solution, and the homogeneous solution was transferred into a high pressure reactor to react at 220° C. for 6 h. After the reaction mixture was cooled to room temperature, the $Fe_3O_4$-RGO nanoparticles were collected, washed, dried and then ultrasonically dispersed in a mixture of 80 mL of ultrapure water and 20 mL of anhydrous ethanol. 25 wt % ammonia water was added to adjust the pH to 10, and the solution was transferred into a three-necked flask and stirred. 20 mL of TEOS-ethanol solution (1.5%, v/v) was dropwise added, and the mixture was stirred at room temperature for 10 h. After the completion of the reaction, magnetic separation was carried out, and the $Fe_3O_4@SiO_2$-RGO composite particles were collected, washed and dried. Then, the composite particles were added to 20 mL of ultrapure water and ultrasonically dispersed. The resulting mixture was transferred to a three-necked flask. 12 mL of a 0.125 mol/L EDTA solution was dropwise added, and the system was allowed to react at 60° C. for 4 h. Magnetic separation was carried out. The obtained composite particles were washed and dried to obtain the $Fe_3O_4@SiO_2@EDTA$-RGO magnetic nano manganese remover.

Test Example 1

Figure 1:
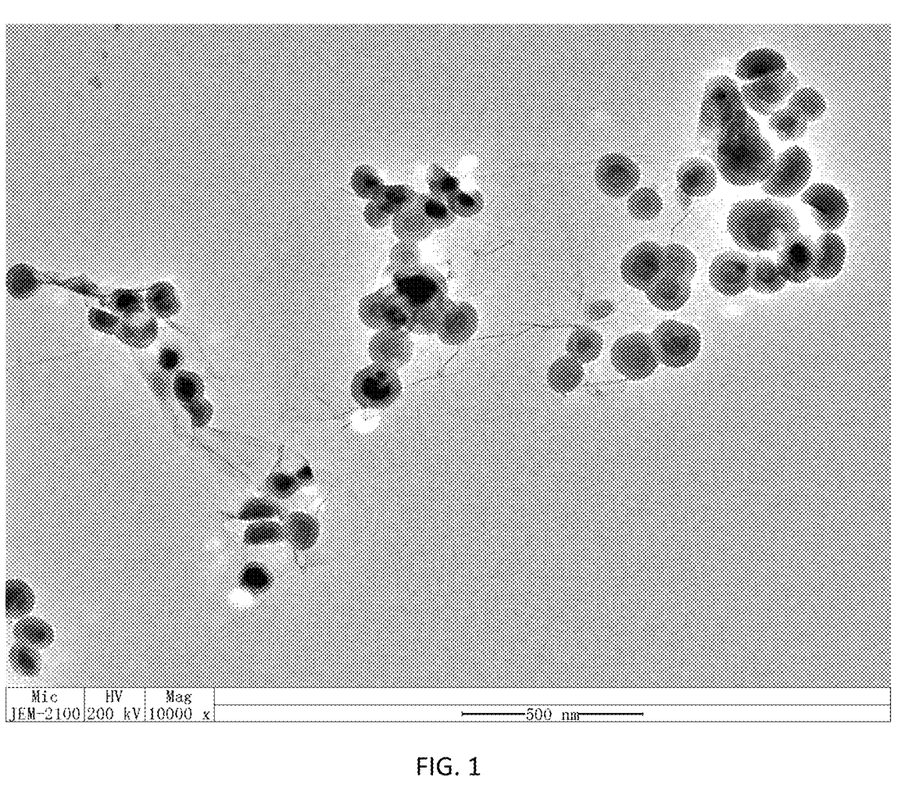
FIG. 1 is a TEM image of $Fe_3O_4$@$SiO_2$@EDTA-RGO prepared in Example 4 of the present disclosure.

The magnetic nano manganese remover ($Fe_3O_4@SiO_2@EDTA$-RGO) prepared in Example 4 was characterized by transmission electron microscopy (TEM). As shown in FIG. 1, the large area of wrinkled substance is RGO. As can be clearly observed, the black nanoparticles are $Fe_3O_4$ nanoparticles, and the light colored part uniformly surrounding the black nanoparticle is $SiO_2$. The $Fe_3O_4@SiO_2$ particles have a uniform size of about 100 nm and are uniformly supported on the surface of the RGO without obvious agglomeration. That is, the $Fe_3O_4$ nanoparticles are supported on the surface of the RGO, the $SiO_2$ coats the $Fe_3O_4$, and the EDTA is grafted on the $SiO_2$.

Application Example 1 Removal of Permanganate Ions

Figure 2:
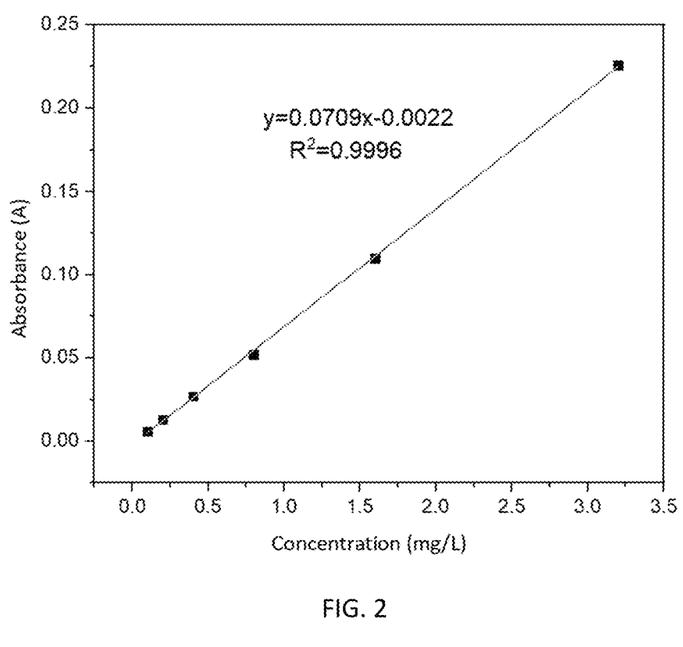
FIG. 2 shows a standard curve of concentration vs absorbance of a permanganate ion solution.
Figure 3:
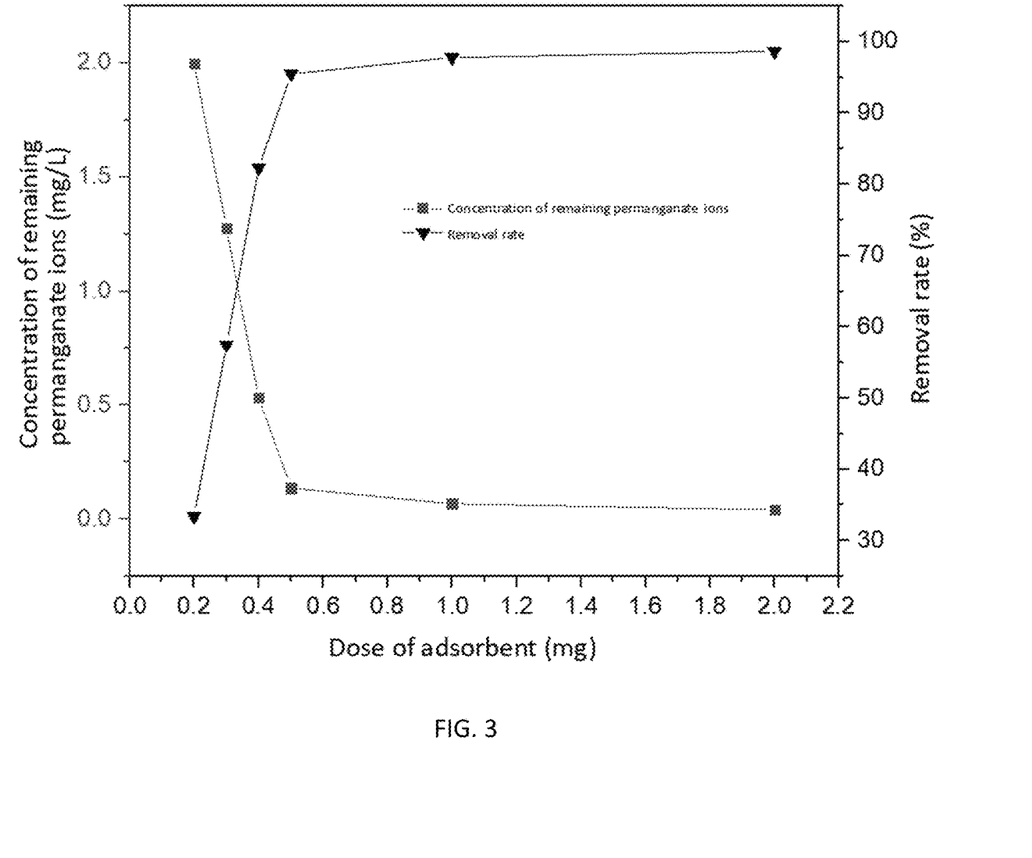
FIG. 3 is a graph showing the effect of dose of $Fe_3O_4$@$SiO_2$@EDTA-RGO prepared in Example 4 of the present disclosure on the removal rate of permanganate.

The $Fe_3O_4@SiO_2@EDTA$-RGO prepared in Example 4 was subjected to a manganese adsorption test, including the following steps:
(1) Drawing of standard curve: Potassium permanganate solutions with concentrations of 1.6 mg/L, 0.8 mg/L, 0.4 mg/L, 0.2 mg/L and 0.1 mg/L were prepared. The absorbance (A) of the corresponding solution at a wavelength $\lambda=525$ nm was measured by an ultraviolet spectrophotometer. The standard curve was drawn with the concentration of permanganate ions as the abscissa and the absorbance as the ordinate. Line fitting was carried out to obtain the equation of the standard curve of permanganate ions: $y=0.0709x-0.0022$, $R^2=0.9996$. FIG. 2 shows a good linear relationship between the concentration of permanganate ions and the absorbance.
(2) Simulation of manganese-containing wastewater: A permanganate ion solution with an initial concentration of 2 mg/L was prepared to simulate the manganese-containing wastewater. Then, 6 aliquots of 20 mL solution were pipetted from the permanganate ion solution into glass bottles as manganese-containing wastewater. 0.2 mg, 0.3 mg, 0.4 mg, 0.5 mg, 1 mg and 2 mg of the magnetic nano manganese remover ($Fe_3O_4@SiO_2@EDTA$-RGO) prepared in Example 4 were respectively added to the 6 aliquots of solution. After ultrasonic dispersion, the resulting mixture was shaken in an air bath thermostatic shaker at 25° C. at a speed of 160 r/min for 90 minutes. After the completion of the shaking, the $Fe_3O_4@SiO_2@EDTA$-RGO was enriched to the bottom of the glass bottle through a magnetic decantation process. The absorbances of the 6 aliquots of permanganate ion solution obtained after manganese removal with the $Fe_3O_4@SiO_2@EDTA$-RGO at the wavelength $\lambda=525$ nm were measured by the ultraviolet spectrophotometer. With reference to FIG. 2, based on the absorbance, the concentration of the corresponding permanganate ion solution obtained after manganese removal with the $Fe_3O_4@SiO_2@EDTA$-RGO (the concentration of remaining permanganate ions) was calculated. Then, according to the formula:

$$R(\%) = \frac{C_0 - C_e}{C_0} \times 100\%,$$

the removal rate of permanganate ions by the $Fe_3O_4@SiO_2@EDTA$-RGO was calculated. In the formula, Co (mg/L) and $C_e$ (mg/L) are respectively the initial concentration of the permanganate ion solution and the concentration of remaining permanganate ions after manganese removal with the $Fe_3O_4@SiO_2@EDTA$-RGO. A graph was drawn based on the concentration of remaining permanganate ions and the removal rate, as shown in FIG. 3.

As can be seen from FIG. 3, as the dose of the magnetic $Fe_3O_4@SiO_2@EDTA$-RGO increases, the concentration of permanganate ions in the solution decreases sharply, and the removal rate of permanganate ions increases accordingly. When the dose is 0.5 mg, the removal rate of permanganate ions is as high as 95.47%. Then, as the dose continues increasing, the removal rate of permanganate ions still increases, but with an extremely small slope. After the dose of 1 mg of $Fe_3O_4@SiO_2@EDTA$-RGO at which the removal rate of permanganate ions is 97.76%, the removal rate increases with an extremely small slope. As a result, when the nano manganese remover prepared by the present disclosure is used to remove manganese from water, a small dose can achieve a good manganese removal effect. Therefore, the nano manganese remover prepared by the present disclosure is expected to become an efficient manganese remover for wastewater.

The nano manganese removers $Fe_3O_4@SiO_2@EDTA$-RGO prepared in other examples were tested according to the above method. When the dose was in the range of 0.5-1 mg, the removal rate of permanganate ions was also as high as 90% or above.

The manganese remover of the present disclosure has the advantages of high removal efficiency for low-concentration permanganate ions, small dosage and no secondary pollution to water. Besides, the manganese remover of the present disclosure is recyclable and reusable, and still has a good removal rate after many adsorption-desorption cycles.

Regeneration test: The $Fe_3O_4@SiO_2@EDTA$-RGO of Example 4 with potassium permanganate adsorbed thereon was enriched using a magnet, and then treated with a dilute HCl solution to make it desorb permanganate. The $Fe_3O_4@SiO_2@EDTA$-RGO was enriched with an external magnetic field and then washed for reuse. The regenerated $Fe_3O_4@SiO_2@EDTA$-RGO continued to be used in the above manganese removal process, with a dose of 0.5 mg for 5 cycles. The manganese removal effect is shown in Table 1. As can be seen, the $Fe_3O_4@SiO_2@EDTA$-RGO is stable, recyclable and reusable, and still has a good adsorption effect after many adsorption-desorption cycles.

TABLE 1

Removal rate of permanganate by
$Fe_3O_4@SiO_2@EDTA$-RGO after 5 cycles

| | Number of cycles | | | | | |
|---|---|---|---|---|---|---|
| | 0 | 1 | 2 | 3 | 4 | 5 |
| Removal rate/% | 95.47 | 93.86 | 90.98 | 89.33 | 86.71 | 85.23 |

Comparative Example 1

50 mL of ethylene glycol was added to a 100 mL beaker. Under the action of ultrasonic stirring, 0.21 g of $FeCl_3.6H_2O$ and 3.75 g of NaAc were added to form a homogeneous solution, and the homogeneous solution was transferred into a high pressure reactor to react at 200° C. for 8 h. After the reaction mixture was cooled to room temperature, the $Fe_3O_4$ nanoparticles were collected, washed, dried and then ultrasonically dispersed in a mixture of 80 mL of ultrapure water and 20 mL of anhydrous ethanol. 28 wt % ammonia water was added to adjust the pH to 13, and the solution was transferred into a three-necked flask and stirred. 20 mL of TEOS-ethanol solution (1.5%, v/v) was dropwise added, and the mixture was stirred at room temperature for 12 h. After the completion of the reaction, magnetic separation was carried out, and the $Fe_3O_4@SiO_2$ composite particles were collected, washed and dried. Then, the composite particles were added to 80 mL of ultrapure water, and 10 mg of RGO was added under ultrasonic dispersion. After the RGO was dispersed uniformly, the resulting mixture was transferred into a high pressure reactor and allowed to react at 120° C. for 6 h. After the completion of the reaction, the reaction mixture was cooled to room temperature. Magnetic separation was carried out. The obtained composite particles were washed and dispersed in 20 mL of ultrapure water. 12 mL of 0.125 mol/L EDTA solution was dropwise added, and the system was allowed to react at 70° C. for 2 h. Magnetic separation was carried out. The obtained composite particles were washed and dried to obtain the $Fe_3O_4@SiO_2@EDTA$-RGO magnetic nano composite material.

The adsorption capacity for permanganate was tested according to the method in Application Example 1. It was found that when the dose was 0.5 mg, the removal rate of permanganate was 70.34%.

Comparative Example 2

37.5 mL of ethylene glycol and 37.5 mL of diethylene glycol were added to a 100 mL beaker. Under the action of ultrasonic stirring, 10 mg of RGO, 0.21 g of $FeCl_3.6H_2O$ and 3.75 g of NaAc were added to form a homogeneous solution, and the homogeneous solution was transferred into a high pressure reactor to react at 200° C. for 8 h. After the reaction mixture was cooled to room temperature, the $Fe_3O_4$-RGO nanoparticles were collected, washed, dried and then ultrasonically dispersed in a mixture of 80 mL of ultrapure water and 20 mL of anhydrous ethanol. 28 wt % ammonia water was added to adjust the pH to 13, and the solution was transferred into a three-necked flask and stirred. 0.3 mL of TEOS was added, and the mixture was stirred at room temperature for 12 h. After the completion of the reaction, magnetic separation was carried out, and the $Fe_3O_4@SiO_2$-RGO composite particles were collected, washed and dried. Then, the composite particles were added to 20 mL of ultrapure water and ultrasonically dispersed. The resulting mixture was transferred to a three-necked flask. 12 mL of a 0.125 mol/L EDTA solution was dropwise added, and the system was allowed to react at 70° C. for 2 h. Magnetic separation was carried out. The obtained composite particles were washed and dried to obtain the composite product. The composite product was characterized by transmission electron microscopy (TEM). It was found that $SiO_2$ did not effectively and uniformly coat $Fe_3O_4$ nanoparticles, but formed $SiO_2$ spheroidal monomers in a large proportion, and the magnetic nano composite material could not be formed effectively.

Comparative Example 3

Disodium EDTA alone cannot adsorb permanganate due to its extremely high stability: there is no reducing group. EDTA and permanganate ions are both negative ions and repel each other, but when EDTA is supported on $Fe_3O_4@SiO_2$-RGO, trapped charges at the $SiO_2$ interface are positive charges, which makes the adsorption of permanganate possible through charge transfer.

Comparative Example 4

50 mL of ethylene glycol was added to a 100 mL beaker. Under the action of ultrasonic stirring, 0.21 g of $FeCl_3.6H_2O$ and 3.75 g of NaAc were added to form a homogeneous solution, and the homogeneous solution was transferred into a high pressure reactor to react at 200° C. for 8 h. After the reaction mixture was cooled to room temperature, the $Fe_3O_4$ nanoparticles were collected, washed, dried and then ultrasonically dispersed in a mixture of 80 mL of ultrapure water and 20 mL of anhydrous ethanol. 28 wt % ammonia water was added to adjust the pH to 13, and the solution was transferred into a three-necked flask and stirred. 20 mL of a TEOS-ethanol solution (1.5%, v/v) was dropwise added, and the mixture was stirred at room temperature for 12 h. After the completion of the reaction, magnetic separation was carried out, and the $Fe_3O_4@SiO_2$ composite particles were collected and washed. Then, the composite particles were ultrasonically dispersed in 20 mL of ultrapure water. 12 mL of a 0.125 mol/L EDTA solution was dropwise added, and the system was allowed to react at 70° C. for 2 h. Magnetic separation was carried out. The obtained composite particles were washed and dried to obtain the $Fe_3O_4@SiO_2@EDTA$ magnetic nano composite material.

The adsorption capacity for permanganate was tested according to the method in Application Example 1. It was found that when the dose was 0.5 mg, the removal rate of permanganate was 57.31%.

Although the present disclosure has been disclosed as above by way of the preferred examples, they are not intended to limit the present disclosure. Any person skilled in the art can make various changes and modifications without departing from the spirit and scope of the present disclosure. Therefore, the protection scope of the present disclosure should be as defined in the claims.

What is claimed is:

1. A composition, comprising ferrous ferric oxide ($Fe_3O_4$) nanoparticles, reduced graphene oxide (RGO), silicon dioxide ($SiO_2$) and ethylenediaminetetraacetic acid disodium salt (EDTA), wherein the $Fe_3O_4$ nanoparticles are supported on the surface of the RGO and coated by the $SiO_2$, and wherein the EDTA is grafted on the $SiO_2$.

2. The composition according to claim 1, wherein mass percentages of the $Fe_3O_4$ nanoparticles, the RGO, the $SiO_2$ and the EDTA are respectively 5.3-16.3%, 0.37-5.7%, 7.4-76% and 17.5-86.9%.

3. A method of making the composition according to claim 1, comprising:
   (1) obtaining the $Fe_3O_4$ nanoparticles supported on the surface of the RGO ("$Fe_3O_4$-RGO");
   (2) dispersing the $Fe_3O_4$-RGO in an ethanol-water solution, dropwise adding ammonia water to adjust pH to 8-13, carrying out ultrasonic dispersion, and dropwise adding a TEOS-ethanol solution under stirring; collecting a reaction product with a magnet, washing the reaction product with water, and drying the reaction product to obtain the $Fe_3O_4$ nanoparticles supported on the surface of the RGO and coated by the $SiO_2$ ("$Fe_3O_4$@$SiO_2$-RGO composite particles"); and
   (3) dispersing the $Fe_3O_4$@$SiO_2$-RGO composite particles in water, and dropwise adding an EDTA-water solution under stirring.

4. The method according to claim 3, wherein a volume fraction of TEOS in the TEOS-ethanol solution is 1.5-5%, and collecting the reaction product is after 8-12 hours of reaction.

5. The method according to claim 3, wherein dropwise adding the EDTA-water solution is at 50-80° C., a concentration of the EDTA-water solution is 0.050-0.175 mol/L.

6. A method of using the composition according to claim 1, comprising removing permanganate ions in manganese-containing wastewater by adding the composition into the wastewater and magnetically removing the composition from the wastewater using a magnetic field.

7. The method according to claim 6, wherein the manganese-containing wastewater comprises electronic waste treatment wastewater, textile wastewater, printing and dyeing wastewater, metallurgical manganese-containing wastewater after treatment with potassium permanganate, incineration fly ash leachate, or any combinations thereof.

8. The method according to claim 6, wherein removing the permanganate ions in the manganese-containing wastewater is by adding the composition into the wastewater at an amount of 0.01-100 mg/ml; and an initial concentration of permanganate in the manganese-containing wastewater is 0.1-2 mg/L.

* * * * *